United States Patent [19]
Jensen

[11] Patent Number: 5,131,264
[45] Date of Patent: Jul. 21, 1992

[54] ABOVE-GROUND STORAGE TANK LIQUID LEAK DETECTOR

[75] Inventor: Jay E. Jensen, Raritan, N.J.

[73] Assignee: Mobil Oil Corporation, Fairfax, Va.

[21] Appl. No.: 758,171

[22] Filed: Sep. 11, 1991

Related U.S. Application Data

[63] Continuation of Ser. No. 588,507, Sep. 19, 1990, abandoned, which is a continuation of Ser. No. 384,612, Jul. 25, 1989, abandoned.

[51] Int. Cl.$^5$ .............................................. G01M 3/26
[52] U.S. Cl. ........................................ 73/49.2; 73/328
[58] Field of Search ......................... 73/49.2, 299, 328

[56] References Cited

U.S. PATENT DOCUMENTS

| | | | |
|---|---|---|---|
| 1,875,779 | 9/1932 | Thomson | 73/328 |
| 3,257,851 | 6/1966 | Altman et al. | 73/299 X |
| 3,538,746 | 11/1970 | Jacobs et al. | 73/49.2 |
| 3,902,356 | 9/1975 | Rupf-Bolz | 73/49.2 |
| 3,939,383 | 2/1976 | Alm | 73/49.2 X |
| 4,389,888 | 6/1983 | Morooka | 73/299 |
| 4,751,841 | 6/1988 | Biard et al. | 73/49.2 |
| 4,862,734 | 9/1989 | Elderton | 73/49.2 |

FOREIGN PATENT DOCUMENTS

| | | | |
|---|---|---|---|
| 89589 | 5/1986 | Japan . | |
| 607011 | 11/1975 | Sweden . | |
| 1303833 | 4/1987 | U.S.S.R. | 73/299 |

OTHER PUBLICATIONS

Lawford, V. N. *Hydrostatic Liquid Level Measurment* In Instr. & Control Syst. pp. 79-81. Aug. 1970.

*Primary Examiner*—Hezron E. Williams
*Assistant Examiner*—Joseph W. Roskos
*Attorney, Agent, or Firm*—Alexander J. McKillop; Charles J. Speciale; Michael J. Mlotkowski

[57] ABSTRACT

An apparatus for detecting a change in the amount of liquid in a storage tank. The apparatus comprises a vertical upright standpipe for filling with a liquid to a level that generates a hydrostatic head pressure substantially equivalent to that exerted by the liquid in the storage tank; a sensor for sensing hydrostatic head pressure differential between the liquid in the storage tank and the liquid in the standpipe; a connector for connecting the standpipe to the pressure differential sensor, the standpipe connector being substantially horizontally disposed to the standpipe; and a connector for connecting the storage tank to the pressure differential sensor, the storage tank connector being substantially horizontally disposed to the storage wherein the standpipe connector and the tank connector are in substantial axial alignment with each other. Any change in the liquid pressure in the tank as a result of leakage from the tank will change the differential pressure measured by the pressure transducer. The apparatus is particularly useful in the detection of leaks from storage tanks containing highly volatile liquids, such as gasoline.

15 Claims, 7 Drawing Sheets

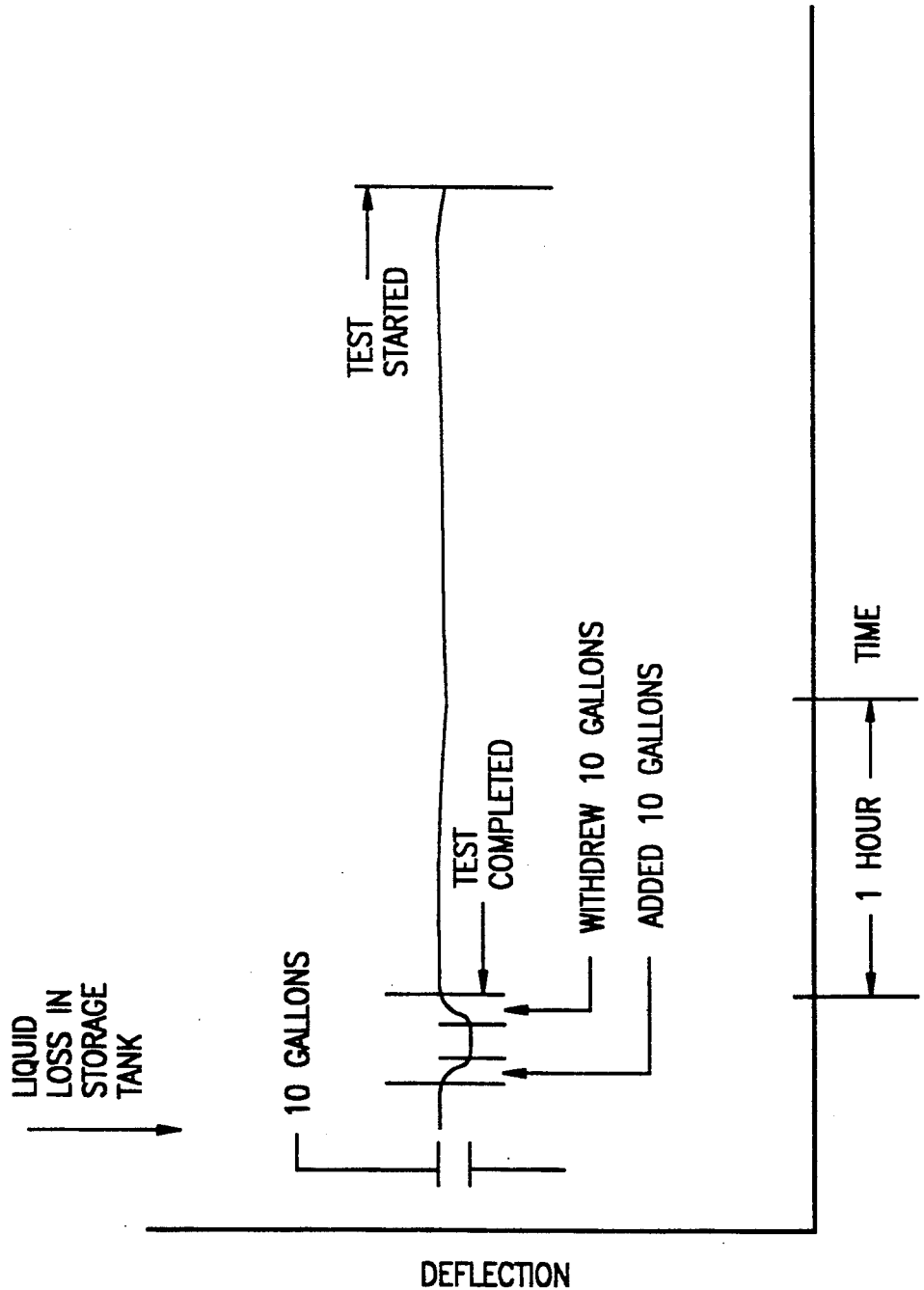

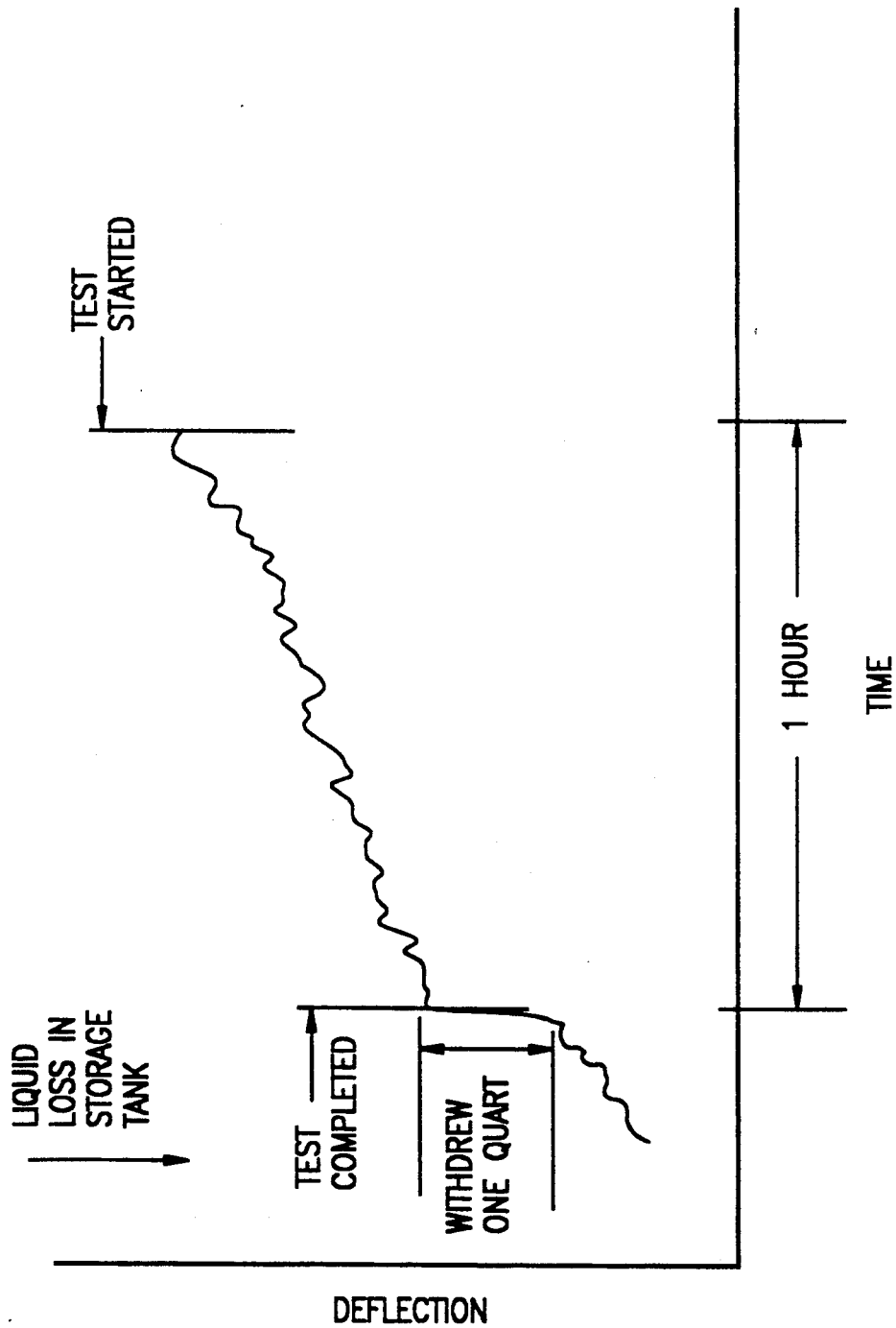

ABOVE-GROUND STORAGE TANK LIQUID LEAK DETECTOR

This is a continuation of copending application Ser. No. 07/588,507, filed on Sep. 19, 1990, now abandoned, which is a continuation of copending application Ser. No. 384,612, filed on Jul. 25, 1989, now abandoned.

FIELD OF THE INVENTION

The present invention relates to an apparatus and method for detecting changes in the liquid level of a storage tank and, more particularly, to a leak detector capable of detecting volatile liquid leaks from a large above-ground storage tank with exceptional accuracy.

BACKGROUND OF THE INVENTION

Liquid products, particularly petroleum-based products, are often stored in very large quantities in above-ground tanks. One concern with such tanks is the possibility that the tank may develop a leak which is not readily discernable through normal methods of inventory control or visual inspection. Significant environmental concerns arise with leaks which are relatively minor when viewed over a short period of time. Such leaks, when left undetected and unrepaired, often result in very substantial leakage over a long period of time.

The problem of leak detection becomes even more acute as the size of the storage tank increases since, as may be envisioned, minor leakage from such tanks will cause only a small change in the level of the liquid in storage. This is particularly true in tanks greater than about 20 feet in diameter. Also, in above-ground tanks, changes in ambient conditions, such as temperature and wind, can affect the level of the liquid in the tank.

A common practice used in industry for assessing above-ground storage tank integrity is to empty the tank of its volatile contents, re-fill the tank with water to a level of at least six feet to provide sufficient head pressure and use visual detection of liquid level variations through a sight glass outside of the tank to measure for possible leaks. As may be readily envisioned, this technique has several disadvantages. One disadvantage is that the tank must be taken out of service periodically to assess its integrity. Another disadvantage is that the water used to conduct the test must either be disposed of as hazardous waste, as a result of its contacting the interior surfaces of the storage tank, or sent to a waste water treatment plant, a facility rarely present at most locations. However, an even more significant disadvantage involves the concern for test accuracy, since visual detection is limited to about 1/16 of an inch variation in liquid level. In a 50 foot diameter tank, 1/16 of an inch equates to a minimum detectable volume in excess of approximately 75 gallons, while in a 100 foot diameter tank, 1/16 of an inch equates to a minimum detectable volume in excess of approximately 300 gallons. Also, changes in temperature, which can cause the liquid in the tank to expand or contract, can significantly affect the measurement as can wind effects and sight glass meniscus resolution.

Another technique which has been considered is to place a pressure transducer adjacent to the bottom of the tank to measure the pressure of the liquid at the bottom of the tank. This technique is not affected by changes in temperature since, although the volume of the liquid may change due to liquid expansion, its weight does not change. This technique has the problem that it requires a pressure transducer that can not only measure the heavy weight of the liquid in the tank, but which can also measure slight variations in the weight. Such a transducer is either not readily available or is prohibitively expensive.

Swiss Patent No. 607,011 discloses a checking device for leakage from large liquid reservoirs and tanks which utilizes a pressure sensitive detector having two chambers separated by a diaphragm. One chamber of the detector is connected to the reservoir and the other to a reference tube. The diaphragm of the pressure sensitive detector can be moved toward a contact member to close an electrical signalling circuit in the event that a leak develops. However, the arrangement disclosed in Swiss Patent No. 607,011 would not be expected to have the accuracy required to assure tank integrity in light of today's environmental concerns and regulations.

Ser. No. 183,121, filed on Apr. 18, 1989, an application in which I am the inventor of the subject matter, discloses a liquid leak detector for above-ground tanks. The leak detector taught therein includes an upright standpipe connected to a tank in such a manner that the standpipe can be filled with the liquid in the tank. Also included is a pressure transducer connected between the bottom of the tank and the bottom of the standpipe to measure the difference in pressure of the liquids in the tank and standpipe. As may be envisioned, any change in the liquid pressure at the bottom of the tank resulting from leakage therefrom will result in a change in the pressure differential measured by the pressure transducer. By utilizing the preferred liquid to liquid pressure transducer disclosed in Ser. No. 183,121, such transducer having the ability to detect pressure head differences on the order of 0.001 inches of water column, good detection capabilities were demonstrated for tests conducted utilizing water and heating oil as the tank fluids. While Ser. No. 183,121 states that the leak detector taught could be used satisfactorily with very volatile liquids whose vapors are heavier than air, such as gasoline, improvements in that system were nevertheless sought to increase test result accuracy when using such volatile fluids. Ser. No. 183,121 is hereby incorporated by reference for all that it discloses.

Therefore, it would be desirable to have a liquid leak detector capable of accurately detecting small leaks in large above-ground tanks which is not adversely affected by the volatility characteristics of the product being stored or by changes in ambient conditions present during the course of assessing tank integrity.

SUMMARY OF THE INVENTION

According to the present invention, there is provided an apparatus for detecting a change in the amount of liquid present in a storage tank which comprises a vertical upright standpipe for filling with a liquid to a level that generates a hydrostatic head pressure substantially equivalent to that exerted by the liquid in the storage tank, means for sensing hydrostatic head pressure differential between the liquid in the storage tank and the liquid in the standpipe to determine a change in the pressure differential resulting from a change in the amount of liquid in the storage tank, means for connecting the standpipe to the pressure differential sensing means, the standpipe connecting means being substantially horizontally disposed to the standpipe and means for connecting the storage tank to the pressure differential sensing means, the storage tank connecting means being substantially horizontally disposed to the storage tank, wherein the standpipe connecting means and the tank connecting means are in substantial axial alignment relative to each other. By substantial axial alignment is meant that the horizontal centerlines of the tank connecting means and the standpipe connecting means are substantially coplanar, i.e., reside substantially within the same plane. A method for detecting liquid leakage from an above-ground storage tank and a storage tank inventory control system, both of which employ the apparatus of the present invention, are also provided.

Therefore, it is an object of the present invention to provide an apparatus for the accurate detection of liquid leakage from above-ground storage tanks.

It is another object of the present invention to provide a leak detection apparatus that is not significantly influenced by changes in atmospheric pressure or temperature.

It is a further object of the present invention to provide an above-ground storage tank leak detector having a level of accuracy which is not significantly influenced by changes in the density of the liquid in the tank.

It is yet another object of the present invention to provide an above-ground storage tank leak detector having a level of accuracy which is not substantially influenced by the volatility characteristics of the liquid present in the tank.

It is yet a further object of the present invention to provide a method for assuring the tightness of an above-ground storage tank that is simple to conduct, highly accurate and can be conducted without replacing the liquid normally stored in the tank with a less volatile liquid.

It is still another object of the present invention to provide a an apparatus for the detection of liquid leaks which can be used as part of, or in conjunction with, a storage tank inventory control system.

Other objects and the several advantages of the present invention will become apparent to those skilled in the art upon a reading of the specification and the claims appended thereto.

BRIEF DESCRIPTION OF THE DRAWINGS

FIGS. 4 through 7 are graphs presenting the results of leak tests made on tanks using the detector of the present invention.

DETAILED DESCRIPTION OF THE INVENTION

Figure 1:
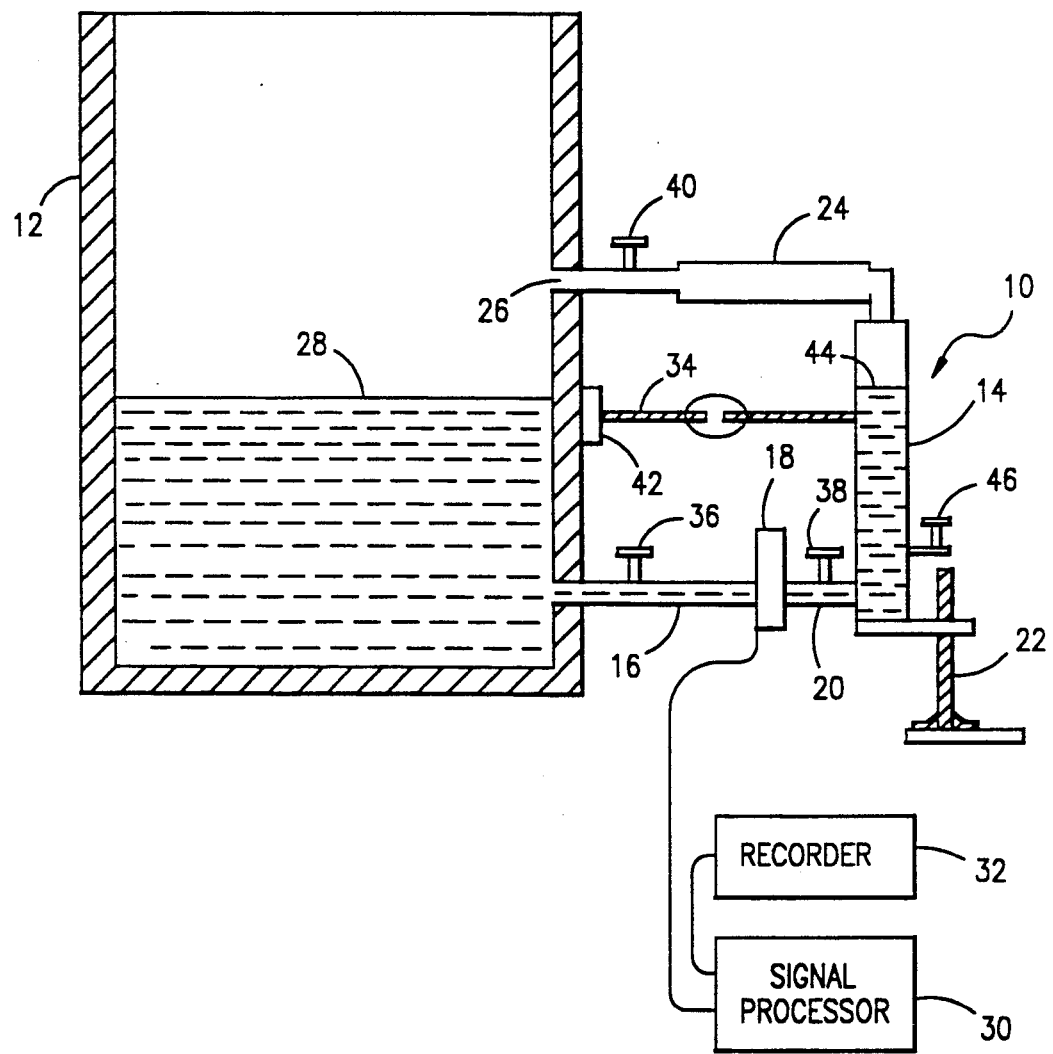
FIG. 1 is a schematic representation of the liquid leak detector of the present invention.

The present invention is best understood by reference to the appended figures, which are given by way of example and not of limitation. Referring now to FIG. 1, there is shown a leak detector system 10 connected to above-ground tank 12. As is necessary for proper performance of leak detector 10, tank 12 is of substantially uniform dimensions, having a cylindrical shape. The leak detector 10 includes an upright cylindrical standpipe 14 which is vertically disposed and axially aligned with tank 12. The positioning of standpipe 14 relative to tank 12 is established and maintained by setting adjustable jackstand 22 and support arm 34, the use of which, though not required, is preferred. Support arm 34 may be advantageously equipped with magnet 42 for ease of affixing the support arm thereto. Tubing or pipe 16 extends between tank 12 and pressure transducer 18. Valve 36 is installed in tubing or pipe 16 for the purpose of aiding in the installation, calibration and removal of the system. Tubing or pipe 20 extends between standpipe 14 and pressure transducer 18. Valve 38 is installed in tubing or pipe 20, again for the purpose of aiding in the installation, calibration and removal of the system. As is usually the case, pressure transducer 18 prevents the flow of fluid between tank 12 and standpipe 14 and is adapted to measure pressure differentials. In the event that it is desired to establish a fluid flow path for filling the standpipe with the fluid from the tank, a tube or pipe with a valve installed therein (not shown) can be employed to bypass the pressure transducer. Such an arrangement is disclosed in FIG. 1 of Ser. No. 183,121. A hose 24 is connected between the top of the standpipe 14 and an outlet opening 26 in tank 12. As shown, outlet opening 26 is to be placed at a point above the liquid level 28 of tank 12.

Pressure transducer 18 is electrically connected to signal processor 30. The signal processor 30 is electrically connected to recorder 32, which may be a pen recorder or the like, for creating a record of the output of signal processor 30. A recorder found to be suitable for this application is the battery operated Soltec Primeline ® Model 6723, available from Soltec Corporation of Palo Alto, CA.

Figure 2:
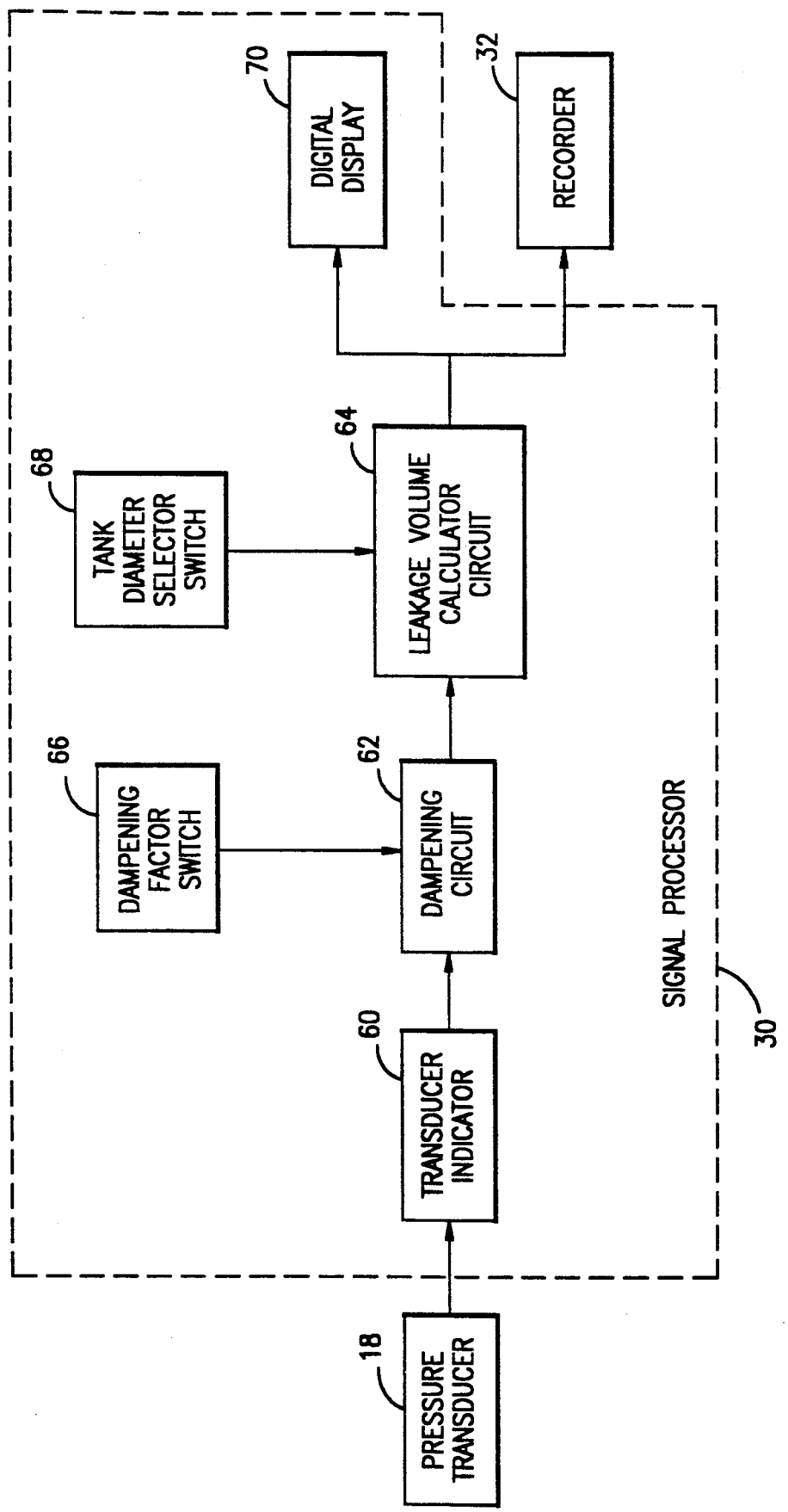
FIG. 2 is a block diagram illustrating the key component circuits contained within the signal processor and their interaction with other leak detector system components.

Referring now to FIG. 2, a block diagram is presented which identifies the chief components and circuits which comprise the signal processor used in the practice of the present invention. As shown, the output from pressure transducer 18 is fed into transducer indicator 60. The preferred transducer indicator is the Validyne CD379 battery operated digital transducer indicator, available from Validyne Engineering Corporation of Northridge, CA. The preferred transducer indicator 60 provides circuitry for transducer excitation and signal conditioning and outputs a DC signal proportional to the pressure differential sensed by pressure transducer 18. The preferred pressure transducer 18 is the Validyne DP-103 liquid to liquid differential pressure transducer capable of resolving differences on the order of 0.001 inches of water column (0.0000361 psi). The output from transducer indicator 60 is fed into dampening circuit 62 wherein additional signal conditioning is provided. Additional dampening is required to eliminate or minimize small signal variations caused by wind effects on the tank liquid surface 28 and/or mechanical vibrations. Dampening factor switch 66 is provided so that the degree of dampening is adjustable. This feature can be advnatageously utilized to adjust for the severity of prevailing weather conditions. The output of dampening circuit 62 is fed into the leakage volume calculator circuit 64. As those skilled in the art will readily understand, to convert a differential pressure reading into a volumetric value, the crossectional area of the tank being tested must be inputed. This is done through the use of tank diameter selector switch 68. The output from the leakage volume calculator circuit is then fed simultaneously into a digital display 70 and into recorder 32.

Figure 3:
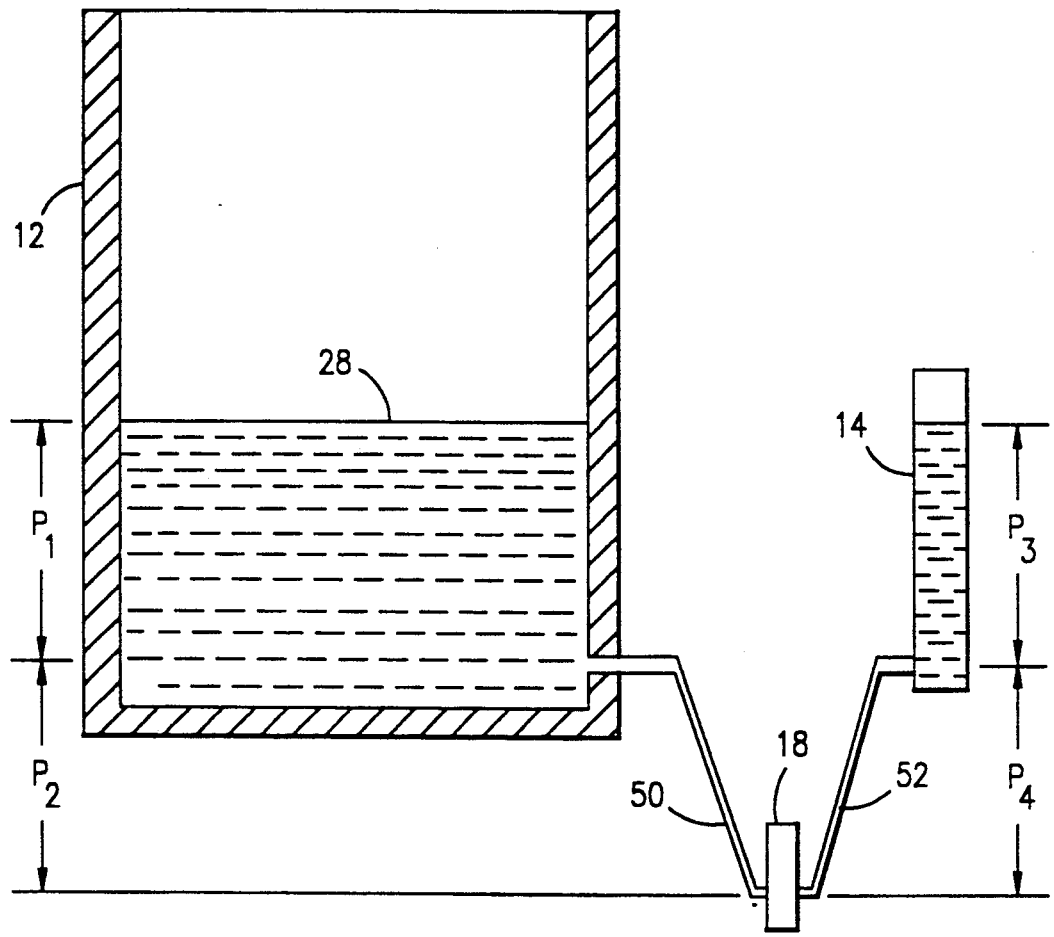
FIG. 3 is a schematic representation of a liquid leak detector configuration found to significantly impair the ability to accurately detect low level leakage of volatile liquids from storage tanks.

The above-ground tank leak detection system of the present invention is predicated on the discovery of factors responsible for system instabilities encountered during tests conducted using volatile liquids, such as gasoline, and the incorporation of design improvements to alleviate such system instabilities. A test system was constructed according to the basic teachings of Ser. No. 183,121. A schematic depiction of such a system provided for the purposes of this discussion is presented in FIG. 3. FIG. 3 depicts only those elements of the system necessary for an understanding of the forces acting upon the system, as those skilled in the art will readily understand. Analysis of the test system of FIG. 3 shows that head pressure differential, as measured by pressure transducer 18, consists of tank 12 head pressure, $P_1$, plus the tubing 50 head pressure, $P_2$, for the tank 12 side of transducer 18, the standpipe 14 head pressure, $P_3$, plus the tubing 52 head pressure, $P_4$, for the standpipe 14 side of pressure transducer 18. Thus, under balanced conditions, the system pressure relationship is as follow:

$$P_1 + P_2 = P_3 + P_4$$

where:

$P_1$ = (Tank 12 Liquid Head) × (Tank 12 Liquid Density)

$P_2$ = (Tubing 50 Liquid Head) × (Tubing 50 Liquid Density)

$P_3$ = (Standpipe 14 Liquid Head) × (Standpipe 14 Liquid Density)

$P_4$ = (Tubing 52 Liquid Head) × (Tubing 52 Liquid Density)

As might be expected, $P_1$ and $P_3$ should not be temperature sensitive and this was verified during field testing. Those same tests demonstrated, however that $P_2$ and $P_4$ were temperature sensitive. Heating and cooling of the fluid in the flexible tubes 50 and 52 caused fluid density changes that were not compensated for by liquid height changes, due to the irregular vertical contour and physical positioning of the tubing. Thermally insulating flexible tubes 50 and 52 was found to produce some benefit to system stability, which meant, therefore that minimizing the effect of fluid density changes in $P_2$ and $P_4$ improved stability. Also discovered was that minimizing the height effect in $P_2$ and $P_4$ should also provide improvements. This was accomplished by design changes wherein external tubing and piping components were positioned substantially horizontal with respect to tank 12 and standpipe 14. As may be envisioned, in a system incorporating such improvements, the tubing liquid head components of the system pressure equation approach zero and the system equation under balanced conditions becomes the following:

$$P_1 + 0 = P_3 + 0$$

where:

$P_1$ = (Tank 12 Liquid Head) × (Tank 12 Liquid Density)

$P_2$ = (0) × (Tubing Liquid Density) = 0

$P_3$ = (Standpipe 14 Liquid Head) × (Standpipe 14 Liquid Density)

$P_4$ = (0) × (Tubing Liquid Density) = 0

Therefore, under balanced conditions, $P_1 = P_3$.

Based on these discoveries, a system incorporating these features was designed and produced. Referring again to FIG. 1, it can be seen that the means for connecting standpipe 14 to the pressure transducer 18 is substantially horizontally disposed relative to standpipe 14. Also, the means for connecting storage tank 12 to pressure transducer 18 is horizontally disposed relative to tank 12. A rigid tube or pipe is preferred for use as the standpipe connecting means and the tank connecting means. Further, to assure that the component of system pressure resulting from a difference in height between the standpipe and tank connecting means is essentially equal to zero, the standpipe connecting means 20 and the tank connecting means 16 are positioned in substantial axial alignment relative to each other, as shown in FIG. 1.

To operate the leak detector of the present invention, the system is installed as shown in FIG. 1, with tank connecting means 16 placed as close to the bottom of tank 12 as practical. Although standpipe 14 can be plumbed so that it can be filled with the liquid present in tank 12, this is not necessary. As can be appreciated, when installed at a bulk fuel storage terminal, the liquid in tank 12 will generally be a volatile hydrocarbon such as gasoline and, therefore, it may be impractical or undesirable to use such liquid in the standpipe. Therefore, it is preferred that water be used to fill the standpipe, as the use of same greatly reduces problems associated with safety, in general, and volatility. To accomodate winter weather testing, a suitable mixture of antifreeze and water can be formulated and used to fill standpipe 14. For example, a mixture of 50% water and 50% glycol has been successfully used and would be expected to provide adequate performance under virtually all conditions. As can be appreciated, when the liquid in standpipe 14 is different from the liquid present in tank 12, the actual level of liquid 28 in tank 12 will differ from the actual level of liquid 44 in standpipe 14 under conditions when system pressures are balanced. This difference in liquid level between tank 12 and standpipe 14 will be proportional to the difference in the density or specific gravity of the two fluids.

After filling standpipe 14 to the proper level, it is important to assure that air bubbles are not entrained within the standpipe liquid. To minimize this occurrence, a small amount of a household detergent can be added to the liquid to reduce its surface tension. Also, drawing a vacuum on the standpipe has been found to aid in the process of air bubble de-entrainment. This can be accomplished by connecting a suitable vacuum pump at the point where wind compensation tube 24 is connected for testing. Valve 38 is to be closed during this operation so that the vacuum is not seen at pressure transducer 18. The pump is used to apply a vacuum of approximately 15 inches of mercury to the standpipe for a period of about 2 minutes. During this period, the standpipe can be tapped to aid in the release of bubbles from the liquid. Following this operation, the vacuum pump is removed and valve 38 opened. Air must also be bled from standpipe connecting means 20 and tank connecting means 16. This is accomplished through the use of transducer air bleed valves (not shown), which are present on either side of pressure transducer 18. The air bleed valves are opened while a pressure head is applied and liquid flow permitted until no air bubbles are seen to exit via the bleed valves. Upon completing this step, hose 24 is installed between the top of standpipe 14 and outlet opening 26.

Following the removal of air from the system, it will likely be necessary to reestablish the proper standpipe liquid height 44. This is accomplished through the use of pressure transducer 18, signal processor 30 and recorder 32. To adjust the level of liquid 44 in standpipe 14, one end of a piece of flexible tubing is connected to valve 46, the other end to a liquid container. Valve 46 is then opened to establish a low flow rate and the response of the falling liquid head monitored on recorder 32. Pen deflection of recorder 32 will occur as the standpipe liquid head pressure approaches the tank liquid pressure. The container and flexible tube arrangement connected at valve 46 can be raised or lowered to permit flow from or to standpipe 14. When using the signal processor of the preferred embodiment, the arithmetic sign of the displayed leakage volume calculation can be used to determine whether the liquid head of standpipe 14 is greater than or less than that of tank 12. If negative, the standpipe liquid head is greater than that of tank 12, requiring some fluid to be removed, while a positive reading signifies that the standpipe liquid head is less than that of tank 12, requiring that some fluid be added.

Upon balancing the system and calibrating the instrumentation, a tank leak test can be conducted. Valves 36, 38 and 40 are to be opened and remain open for the duration of the test. The tank diameter selection switch 68 should be set to the value closest to the actual diameter of tank 12. The dampening factor switch should initially be set to a mid-range value. (A higher degree of dampening may be necessary in the event of severe wind conditions). With the recorder turned on, at least five gallons of liquid should be removed from tank 12 to assure that sufficient recorder resolution exists. Once this is assured, the tank leak test can be begun. Test duration should be at least 4 hours. Longer periods may be required for large diameter tanks.

As can readily be understood, since the level of the liquid 44 in standpipe 14 does not change during the course of the test, small changes in the level of the liquid 28 in tank 12 will be detected by transducer 18. Since transducer 18 is measuring pressure head and not volume of liquid, changes in the level of liquid in either tank 12 or standpipe 14 resulting from temperature changes will not affect the output of the transducer 18. Also, since the top of the standpipe 14 is connected to the tank 12 above the level of the liquid 28 by hose 24, wind effects on the liquid in tank 12 will also be applied to the liquid in standpipe 14. Since the transducer 18 is measuring a difference in pressure, the wind effects will be cancelled out and not affect the output of transducer 18.

The following examples further illustrate the essential features of the apparatus and method of the present invention. As will be apparent to those skilled in the art, the conditions used in the examples which follow are not meant to limit the scope of the invention.

EXAMPLES 1-4

The storage tank tests presented as Examples 1-4 demonstrate the utility of the leak detector of the present invention over a wide range of conditions using liquids of various volatilities. All tests were performed in accordance with the procedures described above. Test conditions and results are as follows:

TABLE

Above-Ground Storage Tank Leak Detection Tests
Test Conditions

| Ex No | Test Liquid | Liq. Height (Feet) | Tank Dia. (Feet) | Amb. Temp (°F.) | Ambient Conditions | Test Dur. (Hrs) | Leak Rate (Qt/Hr) | Resolution |
|---|---|---|---|---|---|---|---|---|
| 1 | Heating Oil | 4.0 | 27.0 | 65 | Sunny & Calm | 4.5 | N.D.[1,2] | 2 gal |
| 2 | Heating Oil | 4.0 | 27.0 | 50 | High Winds | 4.5 | N.D.[1] | 2 gal |
| 3 | Gasoline | 4.0 | 55.0 | 47 | High Winds | 4.0 | N.D.[1,2] | 10 gal |
| 4 | Lube Oil | 3.8 | 30.0 | 59 | Calm | 8.7 | 2.4 | 1 qt |

[1] N.D. = No leak detectable at indicated level of resolution.
[2] Slight product growth observed. (See discussion of test results).

Figure 4:
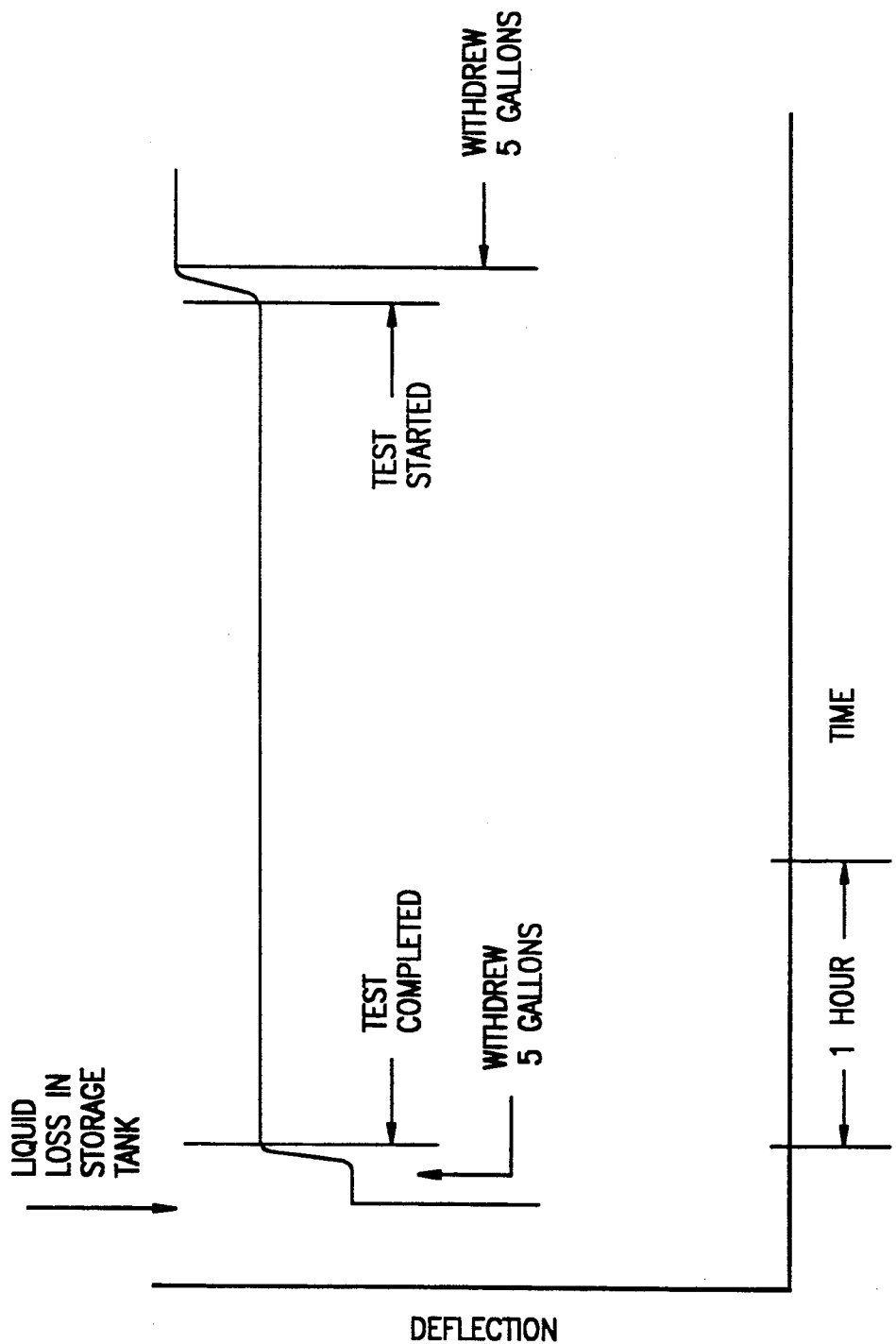
Figure 5:
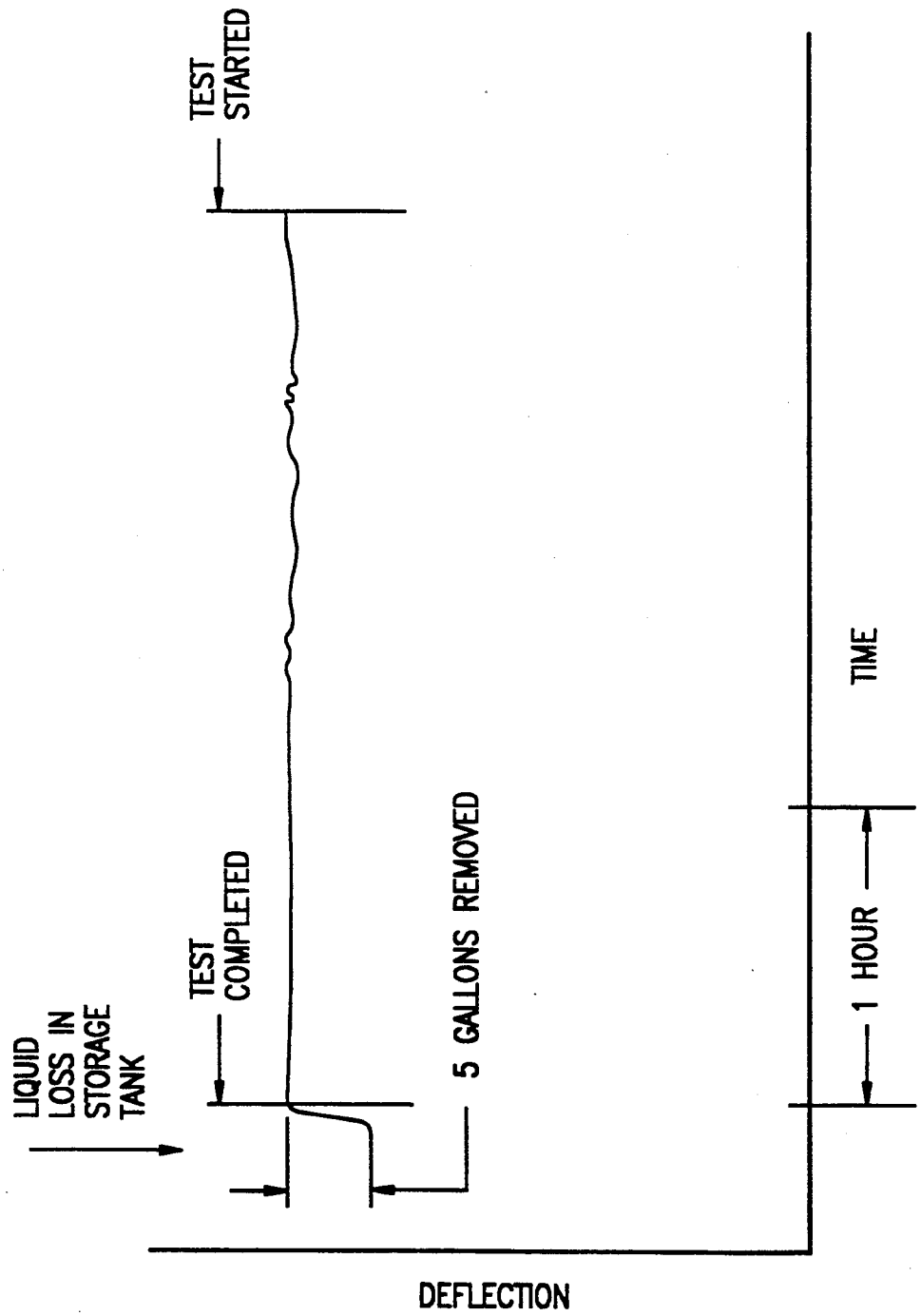

FIGS. 4 through 7 show the recordings made while conducting the tests of Examples 1 through 4; with FIG. 4 corresponding to Example 1, FIG. 5 to Example 2, etc. For the tests shown in FIGS. 4 and 5 (Examples 1 and 2), the tank used had a diameter of 27 feet and contained approximately 17,000 gallons of Mobil No. 2 Heating Oil. Referring now to FIG. 4, excellent test result resolution is demonstrated by the clear change in differential pressure resulting from the withdrawal of 5 gallons (0.029% of total liquid in tank) from the storage tank at the beginning and end of the test. The slight increase in differential pressure with time (product growth on the order of less than 2 gallons) is likely due to weepage of the valve which connects the storage tank to the rest of the tank farm and product pipeline. It should be noted that it is highly desirable to blank this valve off when performing a tank leak test to eliminate the problems associated with weepage of these large valves. FIG. 5 presents the recorder output from the Example 2 test conducted using the same tank and product as used in Example 1. For this test, the tank-to-pipeline valve was blanked off and no product growth was detected during the test period. Also, the test of Example 2 was conducted on a day where high winds were experienced. As may be seen from FIG. 5, the high winds, while perhaps responsible for an increase in chart undulations over those observed in the test of Example 1, did not decrease the ability of the apparatus of the present invention to resolve low level leakage. This is clear from the chart deflection which resulted from the removal of five gallons at the end of the test period, versus the overall deflections (noise) incurred during the test.

For the test shown in FIG. 6 (Example 3) the tank used was 55 feet in diameter and contained approximately 71,000 gallons of Mobil Unleaded Gasoline. The test was conducted on a day on which high winds were experienced, using a tank which did not have the tank-to-pipeline valve blanked off. As indicated above, gasoline poses special problems in leak detection due to its highly volatile nature and high thermal expansion ratio. Additionally, gasoline vapors are heavier than air and tend to reside and exert a varying force on top of the liquid. Despite adverse conditions, excellent resolution was observed using the leak detector of the present invention. The removal and addition of ten gallons of gasoline (0.014% of the total liquid volume) at the end of the test period was clearly discernable. The high winds experienced during the test produced no loss in ability to assess low level tank leakage.

For the test of Example 4, a heated lube oil tank having a diameter of 30 feet was used. The tank was filled to a level of 3.8 feet (approximately 20,000 gallons) with Mobil 10-W-40 motor oil and heated to a temperature of 100° F. Referring now to FIG. 7 for the recorder output corresponding to this test, it can be seen that a small leak was discovered using the leak detector of the present invention. As shown by the ability to resolve the removal of one quart of liquid (0.0013% of total tank liquid volume) at the end of the test period, extremely accurate results were achieved. It should be noted that to conclude that the tank of Example 4 had a leak using the prior art sight glass method of leak detection would have required a test duration of nearly two full days (46 hours). This compares with the leak detector of the present invention which clearly determined both that the tank leaked and the magnitude of the leak in a one hour period.

Thus, there is provided by the present invention a method and apparatus for detecting leaks in above-ground liquid storage tanks which will accurately detect small leaks. The leak detector is not adversely affected by changes in ambient conditions, such as temperature, wind and the like, and is relatively inexpensive to manufacture, install and utilize. Excellent results have been demonstrated for tests conducted using very volatile liquids, such as gasoline, due to the design features described above and incorporated into the leak detector apparatus. Although the discussion of the apparatus has been restricted to its use with above-ground storage tanks, the device could be installed underground and utilized with underground storage tanks, as those skilled in the art will readily understand. Moreover, as with the device disclosed in Ser. No. 183,121, the apparatus of the present invention can also be used as part of, or in conjunction with, a storage tank inventory control system.

Although the present invention has been described with preferred embodiments, it is to be understood that modifications and variations may be resorted to without departing from the spirit and scope of the present invention, as those skilled in the art will readily understand. Such modifications and variations are considered to be within the purview and scope of the appended claims.

What is claimed is:

1. An apparatus for detecting a change in the amount of a first liquid in a storage tank, comprising:
   (a) a vertical upright standpipe for filling with a second liquid comprising water to a level that generates a hydrostatic head pressure substantially equivalent to that exerted by the first liquid in the storage tank;
   (b) means for sensing hydrostatic head pressure differential between the first liquid in the storage tank and the second liquid in the standpipe to determine a change in the pressure differential resulting from a change in the amount of the first liquid in the storage tank wherein said means for sensing hydrostatic head pressure differential comprises a pressure transducer having an electrical output signal proportional to the head pressure differential;
   (c) means for connecting said standpipe to said pressure differential sensing means, said standpipe connecting means being substantially horizontally disposed to said standpipe;
   (d) means for connecting the storage tank to said pressure differential sensing means, said storage tank connecting means being substantially horizontally disposed to the storage tank; and
   (e) an elongated hollow member connected above the liquid level of said standpipe and adapted to be connected to the tank above the level of the first liquid in the tank;
   wherein said standpipe connecting means and said tank connecting means are in substantial axial alignment with each other so that the component of system pressure resulting from a difference in height between said standpipe connecting means and said tank connecting means is essentially equal to zero.

2. The apparatus of claim 1, wherein said elongated hollow member is a hose.

3. The apparatus of claim 1, wherein said standpipe connecting means and said tank connecting means are rigid hollow pipes.

4. The apparatus of claim 3, further comprising a recorder operatively connected to said pressure transducer for the recordation of a signal functionally related to the output signal of said pressure transducer.

5. A method of detecting liquid leakage from an above-ground storage tank containing a first liquid, comprising the steps of:
   (a) connecting a pressure sensing means to the above-ground storage tank using a tank connecting means substantially horizontally disposed to the tank;
   (b) connecting a vertical upright standpipe to the pressure sensing means using a standpipe connecting means substantially horizontally disposed to the standpipe, wherein the standpipe connecting means and the tank connecting means are in substantial axial alignment with each other so that the component of system pressure resulting from a difference in height between the standpipe connecting means and the tank connecting means is essentially equal to zero;
   (c) filling the vertical upright standpipe with a second liquid comprising water to a level that generates a hydrostatic head pressure substantially equivalent to that exerted by the liquid in the storage tank;
   (d) connecting the top of the standpipe to the tank above the level of the first liquid in the tank through the use of an elongated hollow member so that substantially the same ambient conditions are applied to the liquids in the tank and the standpipe; and
   (e) measuring the hydrostatic head pressure differential between the first liquid in the storage tank and the second liquid in the standpipe through the use of the pressure sensing means to determine a change in the pressure differential caused by leakage of liquid from the tank.

6. The method of claim 5, wherein the pressure sensing means is a pressure transducer having an electrical output signal proportional to the head pressure differential.

7. The method of claim 6, wherein the elongated hollow member is a hose.

8. The method of claim 6, wherein the standpipe connecting means and the tank connecting means are rigid hollow pipes.

9. The method of claim 8, further comprising the step of electrically connecting a recorder to the pressure transducer to record a signal functionally related to the output signal of the pressure transducer.

10. The method of claim 6, wherein in step (c), the liquid used to fill the standpipe is different from the liquid present in the tank.

11. The method of claim 10, wherein in step (c), the liquid used to fill the standpipe comprises water.

12. A liquid storage inventory control system, comprising:
  (a) an upright storage tank mounted substantially at ground level and containing a liquid;
  (b) an apparatus for detecting a change in the amount of liquid in a storage tank, including:
  (i) a vertical upright standpipe for filling with a liquid to a level that generates a hydrostatic head pressure substantially equivalent to that exerted by the liquid in the storage tank;
  (ii) means for sensing hydrostatic head pressure differential between the liquid in the storage tank and the liquid in the standpipe to determine a change in the pressure differential resulting from a change in the amount of liquid in the amount of liquid in the storage tank wherein said means for sensing hydrostatic head pressure differential comprises a pressure transducer having an electrical output signal proportional to the head pressure differential;
  (iii) means for connecting said standpipe to said pressure differential sensing means, said standpipe connecting means being substantially horizontally disposed to said standpipe;
  (iv) means for connecting the storage tank to said pressure differential sensing means, said storage tank connecting means being substantially horizontally disposed to the storage tank; and
  (v) an elongated hollow member connected above the liquid level of said standpipe and adapted to be connected to the tank above the level of the liquid in the tank;
  wherein said standpipe connecting means and said tank connecting means are in substantial axial alignment with each other so that the component of system pressure resulting from a difference in height between said standpipe connecting means and said tank connecting means is essentially equal to zero.

13. The liquid storage inventory control system of claim 12, wherein said hollow member is a hose.

14. The liquid storage inventory control system of claim 12, wherein said standpipe connecting means and said tank connecting means are rigid hollow pipes.

15. The liquid storage inventory control system of claim 14, further including a recorder operatively connected to said pressure transducer for the recordation of a signal functionally related to the output signal of said pressure transducer.

* * * * *